United States Patent
Capron et al.

(10) Patent No.: US 11,441,437 B2
(45) Date of Patent: Sep. 13, 2022

(54) IMPELLER SHROUD AND METHOD OF MANUFACTURING THEREOF

(71) Applicant: PRATT & WHITNEY CANADA CORP., Longueuil (CA)

(72) Inventors: Alexandre Capron, Toronto (BE); Bernard Chow, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 146 days.

(21) Appl. No.: 16/784,279

(22) Filed: Feb. 7, 2020

(65) Prior Publication Data
US 2021/0246803 A1    Aug. 12, 2021

(51) Int. Cl.
| B23P 15/02 | (2006.01) |
| F01D 9/06 | (2006.01) |
| F01D 25/24 | (2006.01) |

(52) U.S. Cl.
CPC ............... *F01D 9/06* (2013.01); *B23P 15/02* (2013.01); *F01D 25/24* (2013.01); *F05D 2230/10* (2013.01); *F05D 2240/12* (2013.01)

(58) Field of Classification Search
CPC .... F04D 27/0207; F04D 17/10; F04D 17/105; F04D 29/4206; F02C 3/08; F02C 6/08; F01D 9/026; F01D 9/06; F01D 9/065; F01D 11/02; F01D 11/08; F05D 2260/606; B23P 15/02; B23P 15/005; B23P 15/34; B23P 15/48
See application file for complete search history.

(56) References Cited

U.S. PATENT DOCUMENTS

| 4,479,755 | A  | * | 10/1984 | Skoe | .................. F04D 29/4213 415/1 |
| 5,619,850 | A  |   | 4/1997 | Palmer et al. | |
| 6,183,195 | B1 |   | 2/2001 | Tremaine | |
| 6,447,241 | B2 | * | 9/2002 | Nakao | ................. F04D 29/4213 415/1 |
| 7,442,006 | B2 |   | 10/2008 | Nguyen et al. | |
| 8,074,995 | B2 |   | 12/2011 | Vasagar et al. | |
| 8,105,012 | B2 |   | 1/2012 | Anema | |
| 8,490,408 | B2 | * | 7/2013 | Nichols | .................. F01D 25/28 60/782 |
| 9,567,942 | B1 |   | 2/2017 | Krivitzky et al. | |
| 9,683,488 | B2 |   | 6/2017 | Ress, Jr. et al. | |
| 9,689,263 | B2 |   | 6/2017 | Gharaibah et al. | |
| 9,752,587 | B2 |   | 9/2017 | Fishler | |
| 9,803,652 | B2 | * | 10/2017 | Duong | ................. F04D 29/441 |
| 9,869,328 | B2 |   | 1/2018 | Edwards | |
| 10,287,992 | B2 |   | 5/2019 | Tan et al. | |

(Continued)

*Primary Examiner* — Christopher Verdier
*Assistant Examiner* — Maxime M Adjagbe
(74) *Attorney, Agent, or Firm* — Norton Rose Fulbright Canada LLP (57) ABSTRACT

A shroud configured to be disposed around an impeller of a centrifugal compressor, the shroud has a wall extending circumferentially around a central axis, the wall having an inner face oriented toward a gaspath and an outer face opposed to the inner face, a bleed slot defined in the wall and extending along at least a portion of a circumference thereof, the bleed slot defining a bleed direction from the inner face and away from the gaspath, the bleed direction at the inner face of the wall being either parallel to the central axis or oriented toward the central axis. A method of manufacturing a shroud is provided.

18 Claims, 6 Drawing Sheets

(56) References Cited

U.S. PATENT DOCUMENTS

| | | |
|---|---|---|
| 10,309,409 B2 | 6/2019 | Nesteroff et al. |
| 10,393,149 B2 | 8/2019 | Mondal et al. |
| 10,539,153 B2 | 1/2020 | Thomas et al. |
| 2011/0016877 A1 | 1/2011 | Duong et al. |
| 2019/0226488 A1 | 7/2019 | Tawfik et al. |

* cited by examiner

IMPELLER SHROUD AND METHOD OF MANUFACTURING THEREOF

TECHNICAL FIELD

The application relates generally to gas turbine engines and, more particularly, to bleed features suited for use in impeller shrouds.

BACKGROUND OF THE ART

Engine air systems of gas turbine engines may require extraction of compressed air to support, for instance, cooling flow and bearing pressurization. The air pressure needed may require extraction of bleed air mid-way through a centrifugal stage of a compressor. An aerodynamic design of the bleed geometry influences losses in the bleed system.

SUMMARY

In one aspect, there is provided a shroud configured to be disposed around an impeller of a centrifugal compressor, the shroud having a wall extending circumferentially around a central axis, the wall having an inner face oriented toward a gaspath and an outer face opposed to the inner face, a bleed slot defined in the wall and extending along at least a portion of a circumference thereof, the bleed slot defining a bleed direction from the inner face and away from the gaspath, the bleed direction at the inner face of the wall being either parallel to the central axis or oriented toward the central axis.

In another aspect, there is provided a method of manufacturing a shroud for an impeller, the shroud extending circumferentially around a central axis and defining an inner face oriented toward the central axis and an opposed outer face, the method comprising: creating an inner cut circumferentially extending about the central axis, the inner cut defining an inner cut outline and extending from the inner face toward the outer face; creating an outer cut defining an outer cut outline and extending from the outer face toward the inner face; wherein creating the inner cut and the outer cut includes overlapping the inner and outer cut outlines at at least at one circumferential location relative to the central axis such that, at the at least one circumferential location, a tip section of the inner cut outline is enclosed by the outer cut outline.

In yet another aspect, there is provided a method of manufacturing a shroud for an impeller, the shroud extending circumferentially around a central axis and defining an inner face oriented toward the central axis and an opposed outer face, the method comprising: creating an inner cut from the inner face and extending circumferentially about the central axis, the inner cut having an inner cut outline defining a tip section; and creating an outer cut from the outer face and extending circumferentially about the central axis along a portion of a circumferential length of the inner cut, the outer cut having an outer cut outline, wherein creating the inner cut and creating the outer cut includes either creating an opening through the inner cut by removing the tip section of the inner cut outline with the outer cut extending from the outer face or creating an opening through the outer cut outline by inserting a milling tool through the outer cut up to a point where a tip of the milling tool is entirely received within the outer cut.

DESCRIPTION OF THE DRAWINGS

Reference is now made to the accompanying figures in which.

DETAILED DESCRIPTION

Figure 1:
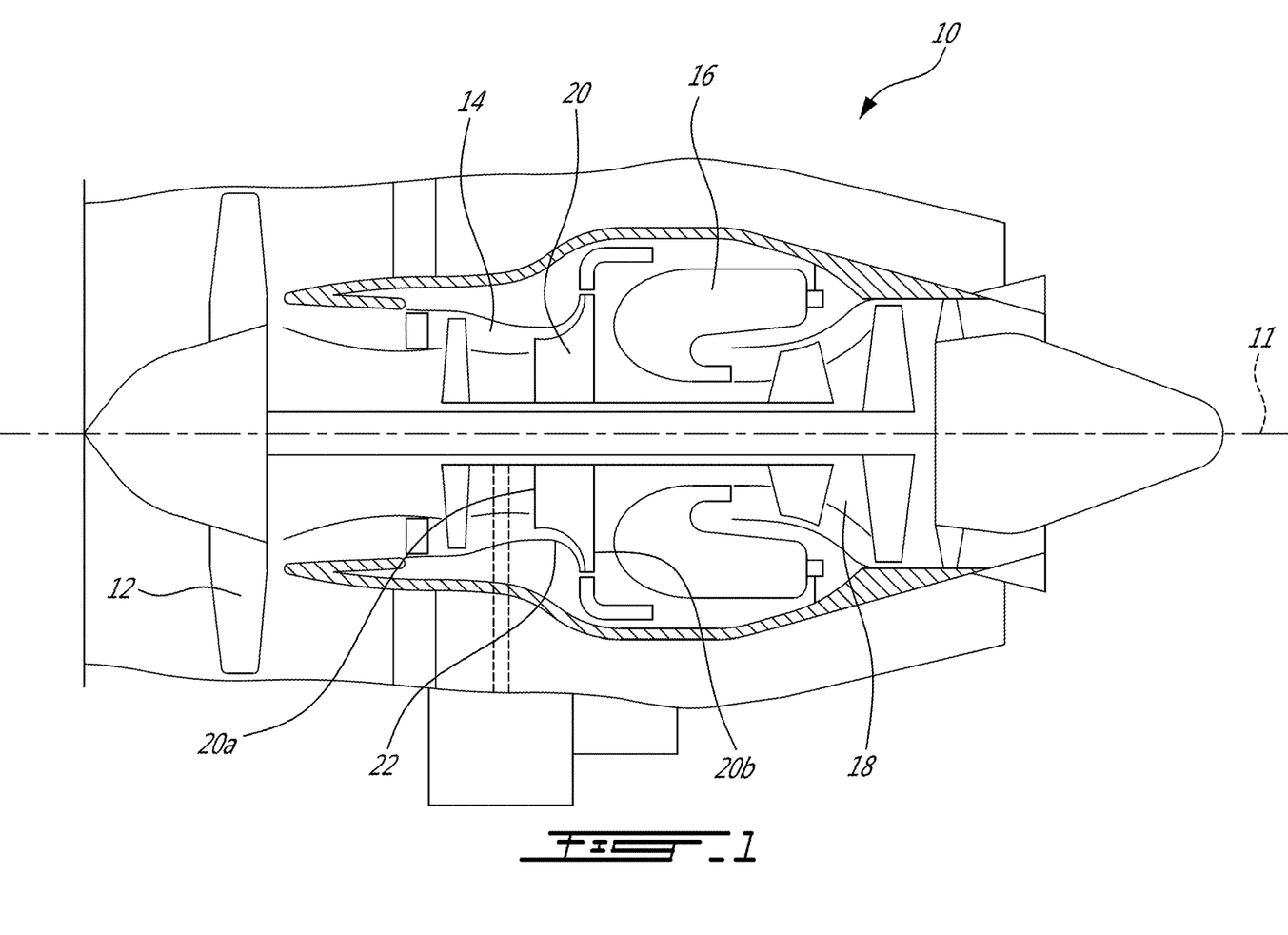
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

Figure 2:
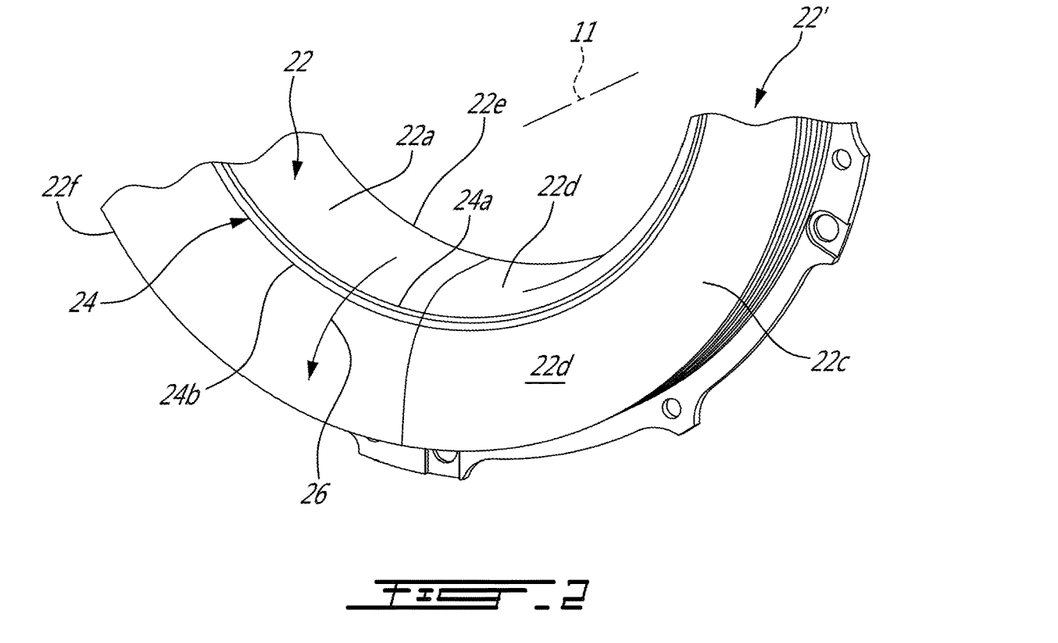
FIG. 2 is a schematic front fragmented three dimensional view of a shroud of an impeller in accordance with one embodiment.
Figure 3:
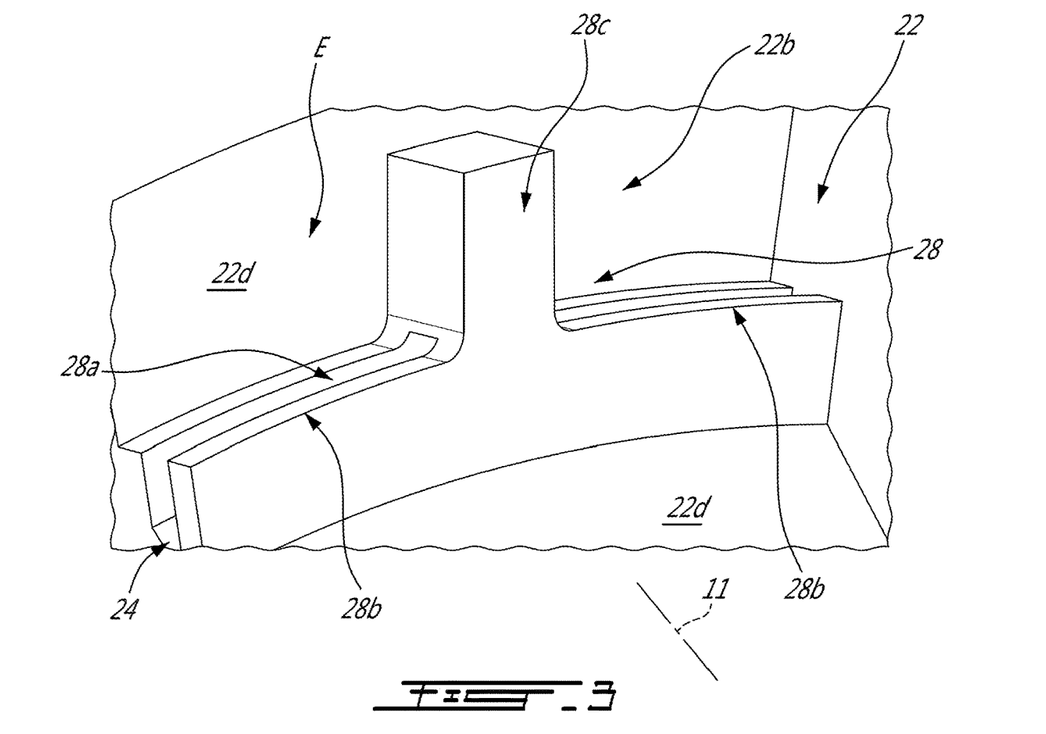
FIG. 3 is a schematic rear fragmented three dimensional view of the shroud of FIG. 2.

Referring to FIGS. 1-2, the compressor section 14 may include an impeller 20 surrounded by an impeller shroud referred to below as a shroud 22. The impeller 20 is configured to rotate about the central axis 11 of the engine 10 and the shroud 22 circumferentially extends all around the impeller 20. The shroud 22 is configured to follow a shape of the impeller 20 blade tip. That is, in the embodiment shown, the impeller 20 is a compressor impeller having an inlet 20a oriented substantially in an axial direction relative to the central axis 11 and an outlet 20b oriented substantially in a radial direction relative to the central axis 11. The impeller 20 has a hub from which blades protrude; the hub curving from being substantially axial at the inlet 20a to being substantially radial at the outlet 20b. The shroud 22 has an inner side, also referred to as an impeller side, a gaspath side, or inner face 22a configured to be oriented toward the impeller 20 and an opposed outer side 22b, also referred to as the back side, the rear side, or the outer face (FIG. 3). The inner side 22a of the shroud 22 is configured to be located proximate tips of the blades and is used for containing a flow within flow channels defined between each two circumferentially adjacent ones of the blades and the hub. The shroud has a fore end 22e located at the inlet 20a of the impeller 20 and an aft end 22f located at the outlet 20b of the impeller 20.

In some cases, it may be required to extract compressed air from the compressor section 14 of the gas turbine engine 10 for operation of other components of the engine 10. For instance, compressed air may be required for pressurizing a cabin of an aircraft equipped with the gas turbine engine 10; for pressurizing bearing cavities containing bearings of the engine 10; for providing the compressed air as cooling air for cooling, for instance, components of the turbine section 18 of the engine; and so forth.

In the embodiment shown, the shroud 22 defines an aperture that fluidly connects the flow passages of the impeller 20 with another component in need of compressed air. Herein, the aperture is provided in the form of a slot or trench 24, also referred to as a bleed slot, that circumferentially extends all around the central axis 11. The slot 24 may extend along a portion of the circumference of the shroud 22. The slot 24 is located downstream of the inlet 20a of the impeller 20 and upstream of the outlet 20b of the impeller 20. The slot 24 may be located mid-way between the inlet 20a and the outlet 20b of the impeller 20. The slot 24 may be located anywhere between the inlet 20a and the outlet 20b of the impeller 20. A direction of a flow of air along the shroud 22 is depicted by arrow 26 in FIG. 2. Although not shown, a chamfer or fillet may be located either at a leading edge 24a of the slot 24 and/or at a trailing edge 24b of the slot 24. The slot 24 extends from the inner face 22a of the shroud 22 through a wall 22c of the shroud 22 and reaches the outer face 22b of the wall 22c of the shroud 22. As the slot 24 extends through the wall 22c, the shroud 22 may have two wall sections 22d that are separated from one another by the slot 24.

Referring now also to FIG. 3, a reinforcing member 28 is located on the outer side 22b of the shroud 22 and protrudes away therefrom. The reinforcing member 28 may be monolithic with the wall 22c of the shroud 22 and may be manufactured from a monolithic piece of material. In other words, the shroud 22 has a body 22' defining both of the wall 22c and the reinforcing member 28. The shroud 22 and the reinforcing member 28 may be, for instance, co-molded or machined from a monolithic block of material. In the embodiment shown, the reinforcing member 28 extends circumferentially all around the central axis 11 of the gas turbine engine 10. The reinforcing member may be provided in the form of a rib having a substantially square or rectangular cross-section taken on a plane containing the central axis 11.

The slot 24 is formed in the impeller side surface 22a without fully penetrating the thickness of the reinforced section 28. A proper milling tool can be used to form the slot 24. After the slot 24 is formed through a portion of the reinforcing member 28, the shroud 22 can be milled with a milling tool which is adapted to route the reinforcing member 28 in spaced-apart sections 28b excavating material until the slot 24 is exposed or opened, thus forming a through bore slot communicating across the wall of the shroud 22. The unmilled areas between the milled sections 28b form circumferentially spaced-apart structural bridges 28c in a rear portion of the slot 24 formed in the shroud 22 whereby to maintain structural rigidity of the shroud 22. In the embodiment shown, the two wall sections 22d are secured to one another via the bridges 28c. The bridges 28c extend from the outer face 22b of the wall 22c on one side of the slot 24 to the outer face 22b of the wall 22c on the opposite side of the slot 24. With the embodiment as shown herein, there may be sixteen of these structural bridges 28c formed about the circumferential slot 24 in the outer face 22b of the shroud 22. More or less bridges 28c may be used without departing from the scope of the present disclosure.

The circumferential continuous slot 24 is in fluid communication with a bleed cavity, or an environment E, outside the gaspath and located behind the shroud 22; the bleed cavity E may be in fluid communication with a component in need of compressed air as described herein above. The slot 24 is in fluid communication with the cavity or environment E outside the gaspath via openings 28a extending from the outer face 22b of the shroud 22 and communicating with the slot 24. As will be described herein below, the slot 24 and the openings 28a may be angled relative to one another. In the embodiment shown, the openings 28a are circumferentially distributed about the central axis 11 and are separated from one another by the bridges 28c. In an alternate embodiment, the openings 28a may be an aperture extending from the outer face 22b of the shroud 22 to the slot 24. Only one opening 28a may be used. A circumferential length of the one opening 28a may correspond to a circumferential length of the slot 24; the one opening 28a and the slot 24 being circumferentially aligned to allow fluid communication between the gaspath and the cavity E.

In order to assist the extraction of bleed air from the pressurized gas path, a chamfer or fillet may be formed in the impeller shroud 22 at the leading edge 24a and/or trailing edge 24b of the slot 24. This chamfer or fillet may assist in directing bleed air from the pressurized gaspath by facilitating the entry of bleed airflow into the slot 24. The chamfer or fillet may facilitate curving of the bleed air into the slot 24. More detail about this configuration are presented in U.S. Pat. No. 8,490,408, the entire content of which is incorporated herein by reference.

In a particular embodiment, impact on rotor dynamics is considerably reduced since the bridge points are on the back side surface of the impeller shroud (i.e. a continuous slot is offered to the gaspath side of the impeller shroud, the bridge points are on the back side). The pressure recovery may be improved as compared with other configurations lacking the continuous slot 24. The slot 24 may contribute to reduce the air system requirement for higher pressure air (fewer losses) and may provide the compressor with better pressure ratio and efficiency.

However, in some cases, it may be require to change defined between the slot 24 and the central axis 11 of the shroud 22 depending, for instance, of the location of the slot 24 along an axial length of the shroud 22 relative to the central axis 11.

Figure 4:
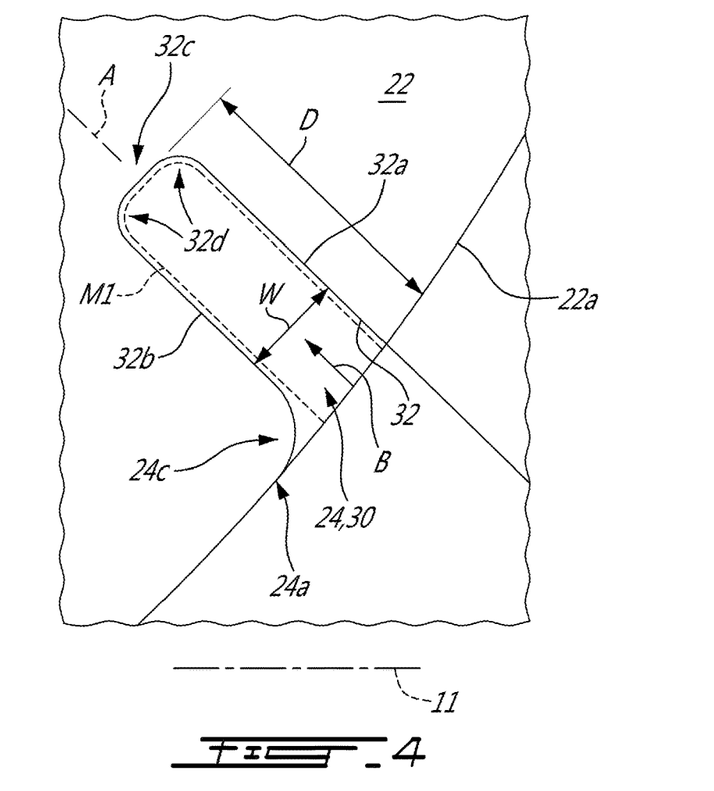
FIG. 4 is a schematic cross-sectional view of a shroud in accordance with another embodiment illustrating an inner cut outline.
Figure 7:
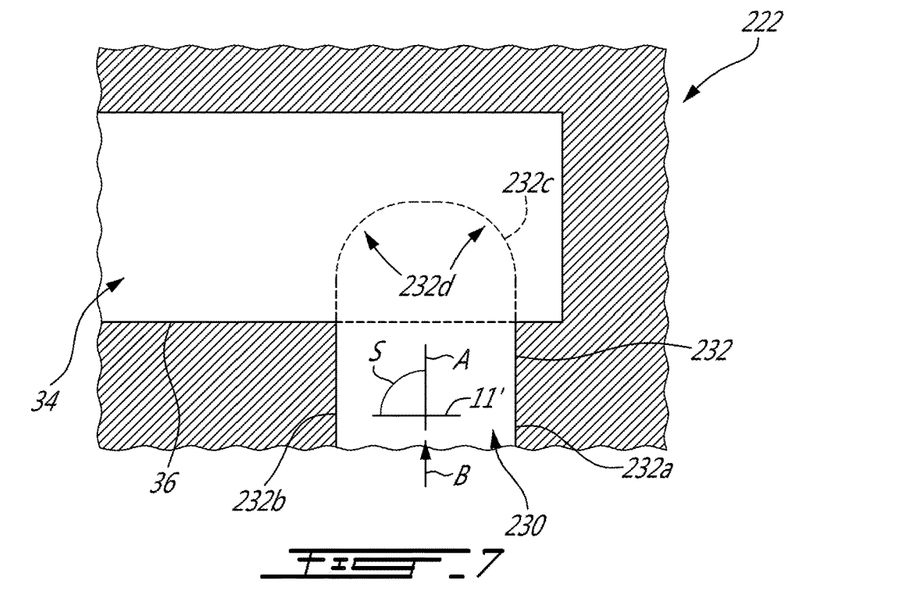
FIG. 7 is a schematic cross-sectional view of a shroud having an inner cut extending at an angle of 90 degrees.
Figure 8:
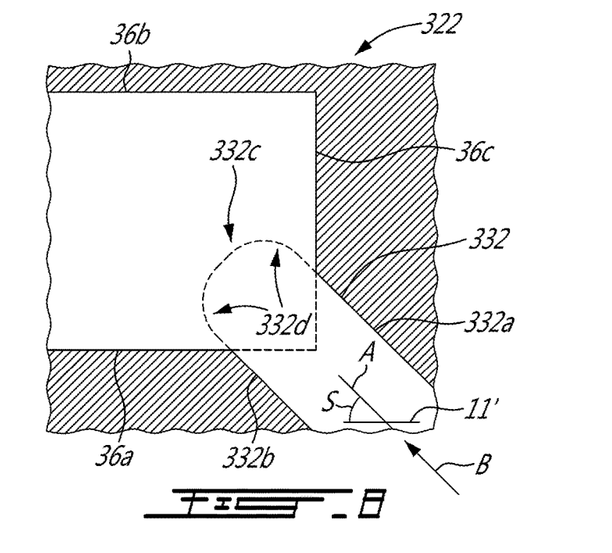
FIG. 8 is a schematic cross-sectional view of a shroud having an inner cut extending at an angle more than 0 degree and less than 90 degrees.
Figure 9:
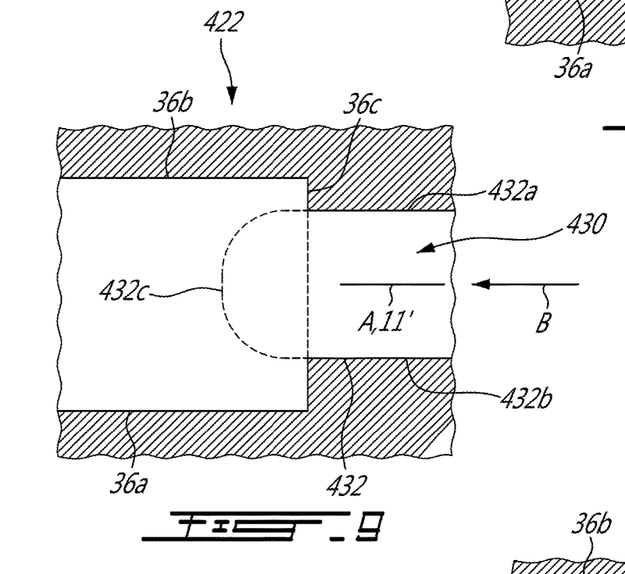
FIG. 9 is a schematic cross-sectional view of a shroud having an inner cut extending at an angle of 0 degree.

Referring now to FIG. 4, the slot or trench 24 is created by the creation of an inner cut 30 that extends from the inner face 22a of the shroud 22. The inner cut 30 has an inner cut outline 32, which may also be referred to has a periphery when seen in a cross-section containing the central axis 11 of the shroud 22. As aforementioned, the inner cut 30 may extend circumferentially all around the central axis 11. A fillet 24c may be located at the leading edge 24a of the slot 24. The slot 24 defines a bleed direction B that extends from the inner face 22a and away from the gaspath. The bleed direction B, at the inner face 22a, may extend away from the central axis 11 (FIGS. 6-8), toward the central axis 11 (FIG. 10), or parallel to the central axis 11 (FIG. 9).

The outline 32 of the inner cut 30 may include two faces 32a, 32b, namely a radially outer face 32a and a radially inner face 32b, being opposed to one another and each circumferentially extending around the central axis 11 and a tip section 32c connecting the two faces 32a, 32b together. In the embodiment shown, the tip section 32c includes fillets 32d at intersections between the tip section 32c and the radially outer and inner faces 32*a*, 32*b*. The fillets 32*d* may result from a shape of a first milling tool M1 used to create the inner cut 30. The first milling tool M1 is shown schematically with a dashed line on FIG. 4. The inner cut outline 32 and the first milling tool M1 are shown schematically with lines that are slightly distanced from one another for illustration purposes. It is understood that, in practice, those two lines may be coincident.

The inner cut 30 may have a width W defined in a direction transverse to a slot axis A; the slot axis A being an axis parallel to a rotation axis of the first milling tool used to create the inner cut 30. The inner cut has a depth D in a direction parallel to the slot axis A. The inner cut 30 has a length in a circumferential direction relative to the central axis 11 of the shroud 22. The slot axis A is parallel to the bleed direction B.

Figure 5:
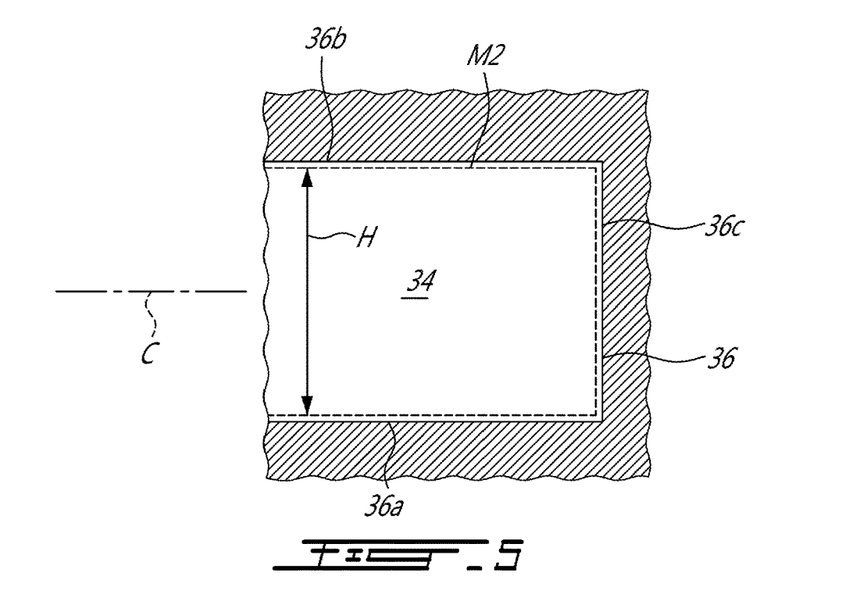
FIG. 5 is a schematic cross-sectional view of a shroud in accordance with another embodiment illustrating an outer cut outline.

Referring now to FIG. 5, to open the slot 24 (FIG. 4), an outer cut 34 is performed and extends from the outer side 22*b* (FIG. 2) of the shroud 22. The bridges 28*c* are created by a plurality of outer cuts 34 circumferentially distributed around the axis 11. It is understood that a number of outer cuts 34 may vary. The outer cut 34 has an outline 36. The outline 36 of the outer cut 34 may include radially inner and outer faces 36*a*, 36*b* and an end face 36*c* connecting the radially inner and outer faces 36*a*, 36*b*. The outer cut 34 may extend along a portion of a circumference of the shroud 22. The outer cut 34 may have a height H taken in a direction transverse to an outer cut axis C parallel to a rotation axis of a second milling tool M2 used to create the outer cut 34. The second milling tool M2 is shown schematically with a dashed line on FIG. 5. The outer cut outline 36 and the second milling tool M2 are shown schematically with lines that are slightly distanced from one another for illustration purposes. It is understood that, in practice, those two lines may be coincident.

A depth of the outer cut 34 taken along a direction parallel to the outer cut axis C may vary in function of a thickness of the reinforcing member 28 (FIG. 3) of the shroud 22. The height H of the outer cut 34 may be equal to or greater than the width W (FIG. 4) of the inner cut 30. In other words, a diameter of the second milling tool used to create the second cut 34 may be equal to or greater than a diameter of the first milling tool used to create the first cut 30. Herein, the height H of the outer cut 34 is greater than the width W of the inner cut 30. Although not illustrated in FIG. 5, fillets may be located at intersection between the end face 36*c* and the radially inner and outer faces 36*a*, 36*b* of the outer cut outline 36.

A plurality of configurations of shrouds 22 may be obtained by varying an angle of the slot axis A relative to the central axis 11. However, for each configurations, which are described herein below, care should be taken to ensure that both of the inner cut outline 32 and the outer cut outline 36 overlap each other to allow the air circulating within the gaspath to be bled. Moreover, care should be taken to maximize an area of an intersection between the two outlines 32, 36 to avoid creating a constriction in a fluid passage resulting from the overlap of the two cuts 30, 34 and to avoid creating a recess in which a swirl of air may be created and which may create losses.

Five shroud configurations are described herein below with reference to FIGS. 6-10, each associated with a given range of an angle defined between the slot axis A and the central axis 11 of the shroud 22.

Figure 6:
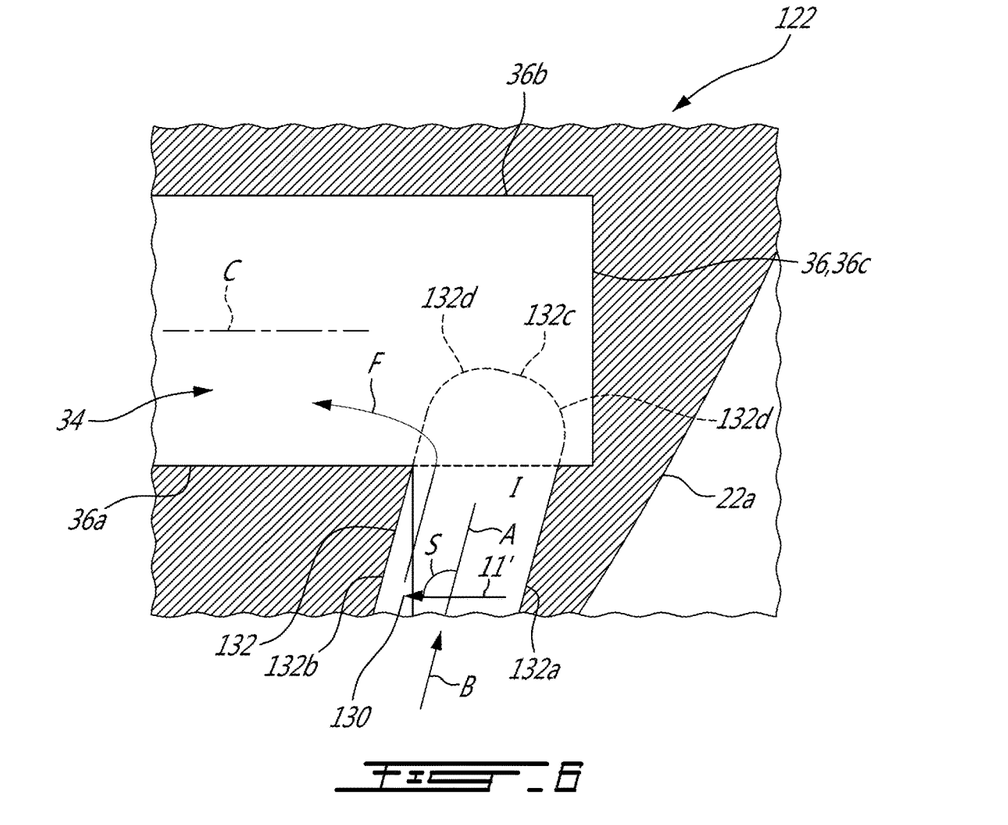
FIG. 6 is a schematic cross-sectional view of a shroud in accordance with another embodiment having an inner cut extending at an angle greater than 90 degrees.

Referring more particularly to FIG. 6, the slot angle S is greater than 90 degrees. The slot angle S is defined between an axis 11' parallel to the central axis 11 of the shroud 22 and the slot axis A and extends from the central axis 11 to the slot axis A in a clockwise direction. This definition of the slot angle S may be applied to each of the other four configurations described herein below. In all of the embodiments shown herein, the outer cut axis C is parallel to the central axis 11. However, other configurations are contemplated without departing from the scope of the present disclosure.

The outline 132 of the inner cut 130 has a tip section 132*c* (dashed line in FIG. 6), which, in the embodiment shown, includes fillets 132*d*. A radius of the fillet 132*d* may be varied. However, a ratio of the radius of the fillets 132*d* to a diameter of the first milling tool M1 (FIG. 4) used to create the inner cut 130 may decrease as the diameter of the first milling tool M1 increases.

As shown in FIG. 6, the two outlines 132, 36 overlap each other such that the tip section 132*c* of the outline 132 of the inner cut 130 is enclosed in the outline 36 of the outer cut 34. This overlap is located when the inner cut 130 and the outer cut 34 are circumferentially aligned one relative to the other to allow fluid communication via a flow path depicted by arrow F in FIG. 6 and extending form the gas path to the environment E (FIG. 2) outside the gas path via the inner and the outer cuts 130, 34. In other words, the overlapping of the inner cut outline 132 and the outer cut outline 36 is present at at least one circumferential location relative to the central axis 11 such that, at the at least one circumferential location, the tip section 132*c* of the inner cut outline 132 is enclosed by the outer cut outline 36. As aforementioned, this overlap is such that an area of an intersection I, which is shown with a dashed line in FIG. 6, between the two outlines 132, 36, is maximized. This intersection I corresponds to a location where the two cuts 130, 34 meet one another. This intersection I corresponds to a passage via which the flow may circulate from one of the cuts 130, 34 to the other to bleed the flow.

If the outer cut 34 is milled before the inner cut 130, the first milling tool M1 (FIG. 4) used to create the inner cut 130 is inserted through the shroud 22 from the inner face 22*a* (FIG. 2) to increase a depth of the inner cut 130 up to a point where a tip or end of the first milling tool M1 is entirely received within the outer cut 34. The tip or end of the milling tool includes its extremity and extends along a tool axis, which is parallel to the slot axis A, from the extremity along an axial length ending at a location where fillets of the first milling tool ends. In other words, the tip or end of the first milling tool includes its extremity and the fillets. Stated differently, the tip or end of the milling tool includes a portion of the first milling tool where a diameter thereof varies along the tool axis and ends at the extremity of the first milling tool. The first milling tool M1 may be penetrated into the outer cut outline 36 up to a point where an area of the intersection I between the two cuts 30, 34 is independent of an increase of the depth of the milling tool through the shroud 122. Then, the first milling tool M1 may be rotated relative to the shroud 122 about the central axis 11 to create the inner cut 130, which may be axisymmetric.

Figure 6A:
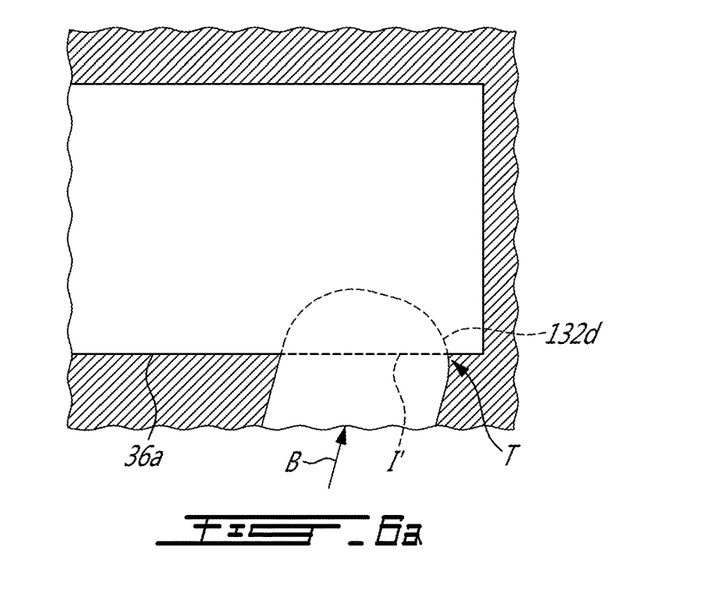
FIGS. 6a to 6c are schematic cross-sectional views of the shroud of FIG. 6 illustrating possible issues when creating inner and outer cuts.

Referring to FIGS. 6 and 6*a*, if the milling tool used to create the inner cut 130 is not inserted deep enough, the radially inner face 36*a* of the outer cut outline 36 will intersect the inner cut outline 32 at one of the fillets 132*d* thereby creating a constriction, or throat, T in the flow passage F. This may be undesirable from an efficiency point of view. In other words, an area I' of the intersection between the two cuts would be less than what it would have been had the milling tool been inserted deeper as illustrated in FIG. 6.

Figure 6B:
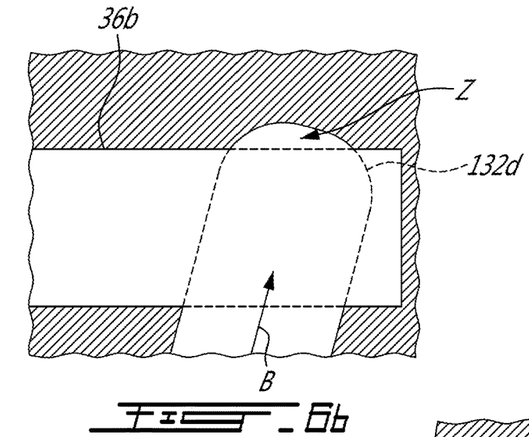

Referring to FIGS. 6 and 6*b*, if the milling tool used to create the inner cut 130 is inserted too deep, then the milling tool will extend radially beyond the radially outer face 36b of the outer cut outline 36 thereby creating a cavity or zone Z where flow recirculation may occur, which may increase loss.

Figure 6C:
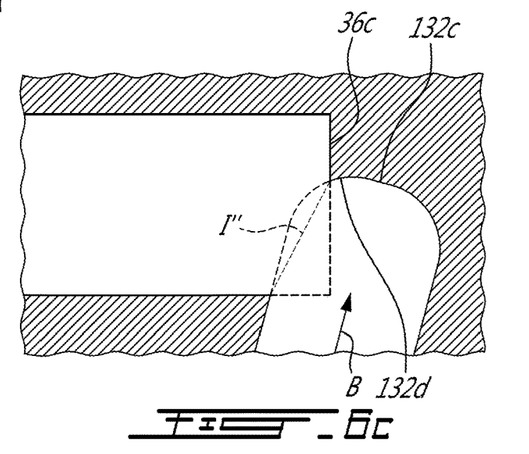

Referring to FIGS. 6 and 6c, alternatively, if the inner cut 130 is milled before the outer cut 34, the second milling tool M2 (FIG. 5) used to create the outer cut 34 is inserted though the shroud 22 from the outer face 22b (FIG. 2) to increase a depth of the outer cut 34 up to a point where the outer cut outline 36 encompasses the tip section 132c of the inner cut outline 132. In other words, the milling tool penetrates the shroud 122 up to a point where the tip section 132c of the inner cut outline 132 is machined away by the second milling tool M2. If the second milling tool M2 used to create the outer cut 34 is not inserted deep enough, the end face 36c of the outer cut outline 36 will intersect the inner cut outline 132 at the tip section 132c thereof as shown in FIG. 6c thereby resulting in an area of passage I" between the inner and outer cuts 130, 34 being smaller than if the second milling tool M2 had been inserted deeper as shown in FIG. 6.

Referring now to FIGS. 7-10, other embodiments of shrouds are shown generally at 222, 322, 422, 522. These embodiments differ from one another by the slot angle S. In these embodiments, the outer cut 34 is performed parallel to the central axis 11 of the shrouds 222, 322, 422, 522. The table below summarizes the conditions to meet for each value of the slot angle S to ensure that the tip sections of the inner cut outlines are contained within the outer cut outlines:

| Slot angle (FIG.) | Face of outer cut outline | Condition |
|---|---|---|
| S > 90 deg. (FIG. 6) | Radially inner face 36a | Located radially inward of a radially inner most point of the tip section 132c, which corresponds to an intersection between tip section 132c and a radially outer face 132a of the inner cut outline 132 |
| | Radially outer face 36b | Located radially outward of a radially outer most point of the tip section 132c, which corresponds to any point on a radially outer most one of the fillets 132d |
| | End face 36c | Located axially aft of an aft most point of the tip section 132c, which corresponds to any point on an aft most one of the fillets 132d |
| S = 90 deg. (FIG. 7) | Radially inner face 36a | Located radially inward of a radially inner most point of the tip section 232c, which corresponds to intersections between tip section 232c and both of the radially outer face 232a and radially inner face 232b of the inner cut outline 232 |
| | Radially outer face 36b | Located radially outward of any point of the tip section 232c |
| | End face 36c | Located axially aft of an aft most point of the tip section 232c, which corresponds to any point on the radially outer face 232a of the inner cut outline 232 |
| 0 < S < 90 deg. (FIG. 8) | Radially inner face 36a | Located radially inward of a radially inner most point of the tip section 332c, which corresponds to an intersection between the tip section 332c and a radially inner face 332b of the inner cut outline 332 |
| | Radially outer face 36b | Located radially outwardly of a radially outer most point of the tip section 332c, which corresponds to any point on a radially outer most one of the fillets 332d |
| | End face 36c | Located axially aft of an aft most point of the tip section 332c, which corresponds to an intersection between the tip section 332c and the radially outer face 332a of the inner cut outline 332 |
| S = 0 deg. (FIG. 9) | Radially inner face 36a | Located radially inward of a radially inner most point of the tip section 432c, which corresponds to an intersection between the tip section 432c and a radially inner face 432b of the inner cut outline 432 |
| | Radially outer face 36b | Located radially outwardly of a radially outer most point of the tip section 432c, which corresponds to an intersection between the tip section 432c and a radially outer face 432a of the inner cut outline 432 |
| | End face 36c | Located axially aft of an aft most point of the tip section 432c, which corresponds to intersections between the tip section 432c and both of the radially outer and inner faces 432a, 432b of the inner cut outline 432 |
| S < 0 deg. (FIG. 10) | Radially inner face 36a | Located radially inward of a radially inner most point of the tip section 532c, which corresponds to any point on a radially inner most one of the fillets 532d |
| | Radially outer face 36b | Located radially outwardly of a radially outer most point of the tip section 532c, which corresponds to an intersection between the tip section 532c and a radially outer face 532a of the inner cut outline 532 |
| | End face 36c | Located axially aft of an aft most point of the tip section 532c, which corresponds to an intersection between the tip section 532c and a radially inner face 532b of the inner cut outline 532 |

In the table above, "axially aft" refers to the right-hand-side of the Figures and "radially inward" refers to the bottom of the Figures.

Figure 10:
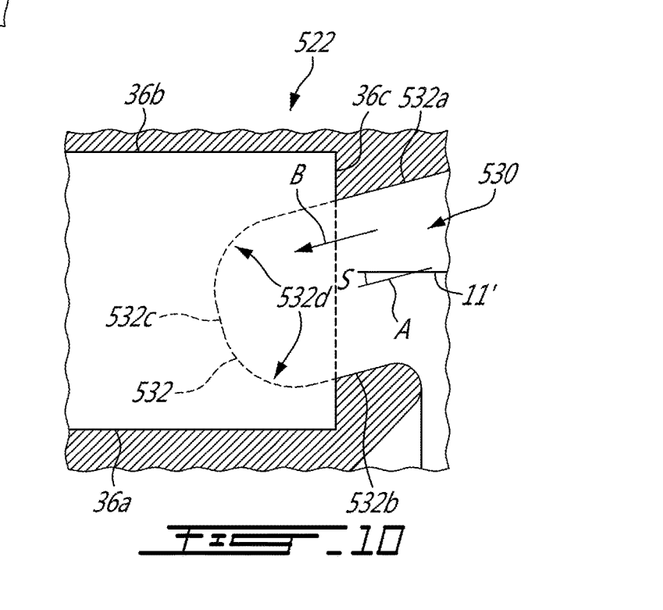
FIG. 10 is a schematic cross-sectional view of a shroud having an inner cut extending at an angle less than 0 degree.

Referring more particularly to FIGS. 9-10, the slot angle S is 0 degree or less such that the inner cut 430 (or slot) extends from the inner face 22a (FIG. 1) toward the outer face 22b (FIG. 1) and either toward the central axis 11 or parallel to the central axis 11. In a particular embodiment, the slot angle S, also referred to as the angle between the bleed direction B and the central axis 11, ranges from −80 degrees to 170 degrees. A slot having a slot angle S of about 170 degrees may be located proximate the inlet of the impeller and oriented substantially axially. A slot having a slot angle S of about −80 degrees may be located proximate the outlet of the impeller and oriented substantially radially. In other words, a flow of air bled from the compressor flowing within the inner cut 430 along the bleed direction B either flows parallel to the central axis 11 or toward the central axis 11. In both cases, the bleed direction B corresponding to a direction of the flow in the inner cut 430 has an axial component relative to the central axis 11 that is in an opposite direction than an axial component of the flow circulating in the gas path of the impeller 20 (FIG. 1). Such a configuration may be useful when it is needed to bleed the compressor 15 at a bleed location proximate its outlet 20b (FIG. 1) where a pressure of the air in the gaspath is greater than any locations upstream to the bleed location. The inner cut 430, 530 may be angled as such to avoid intersecting the inner cut with structural components of the engine 10 (FIG. 1) to which the shrouds 422, 522 is secured. The inner cuts 430, 530 may be located anywhere along an axial length of the shroud.

Embodiments disclosed herein include:

A. A shroud configured to be disposed around an impeller of a centrifugal compressor, the shroud having a wall extending circumferentially around a central axis, the wall having an inner face oriented toward a gaspath and an outer face opposed to the inner face, a bleed slot defined in the wall and extending along at least a portion of a circumference thereof, the bleed slot defining a bleed direction from the inner face and away from the gaspath, the bleed direction at the inner face of the wall being either parallel to the central axis or oriented toward the central axis.

Element A may include any of the following elements, in any combinations:

Element 1: bridges secured to the wall and being distributed around the central axis and spanning across the bleed slot. Element 2: an angle between the bleed direction and the central axis ranges from −80 to 170 degrees.

B. A method of manufacturing a shroud for an impeller, the shroud extending circumferentially around a central axis and defining an inner face oriented toward the central axis and an opposed outer face, the method comprising: creating an inner cut circumferentially extending about the central axis, the inner cut defining an inner cut outline and extending from the inner face toward the outer face; creating an outer cut defining an outer cut outline and extending from the outer face toward the inner face; wherein creating the inner cut and the outer cut includes overlapping the inner and outer cut outlines at at least at one circumferential location relative to the central axis such that, at the at least one circumferential location, a tip section of the inner cut outline is enclosed by the outer cut outline.

C. A method of manufacturing a shroud for an impeller, the shroud extending circumferentially around a central axis and defining an inner face oriented toward the central axis and an opposed outer face, the method comprising: creating an inner cut from the inner face and extending circumferentially about the central axis, the inner cut having an inner cut outline defining a tip section; and creating an outer cut from the outer face and extending circumferentially about the central axis along a portion of a circumferential length of the inner cut, the outer cut having an outer cut outline, wherein creating the inner cut and creating the outer cut includes either creating an opening through the inner cut by removing the tip section of the inner cut outline with the outer cut extending from the outer face or creating an opening through the outer cut outline by inserting a milling tool through the outer cut up to a point where a tip of the milling tool is entirely received within the outer cut.

Elements B and C may include any of the following elements, in any combinations:

Element 3: wherein overlapping the inner and outer cut outlines includes increasing a depth of the inner cut with a milling tool up to a point where an end of the milling tool is entirely received within the outer cut. Element 4: overlapping the inner and outer cut outlines includes increasing a depth of the outer cut with a milling tool until the tip section of the inner cut outline is machined away by the milling tool. Element 5: creating the inner cut before creating the outer cut. Element 6: the tip section of the inner cut outline includes fillets. Element 7: creating the inner cut includes creating the inner cut extending circumferentially all around the central axis. Element 8: creating the outer cut includes creating the outer cut extending along a portion of a circumference of the shroud, overlapping the inner and outer cut outlines includes overlapping the inner and outer cut outlines along the portion of the circumference. Element 9: creating the inner cut includes creating the inner cut extending either parallel to the central axis or toward the central axis from the inner face. Element 10 inserting a milling tool through the inner face to create the inner cut outline up to a point where an area of an intersection between the inner and outer cut outlines is independent of an increase of the depth of the milling tool through the shroud; and rotating the milling tool relative to the shroud about the central axis to create the inner cut. Element 11: creating the inner cut includes milling the inner cut with a first milling tool and wherein creating the outer cut includes milling the outer cut with a second milling tool having a diameter greater than that of the first milling tool. Element 12: inserting the milling tool includes inserting the milling tool up to a point where an area of the opening through the outer cut is independent of an increase of the depth of the milling tool through the shroud; and rotating the milling tool relative to the shroud about the central axis to create the inner cut. Element 13: creating the outer cut includes creating a plurality of outer cuts circumferentially distributed about the central axis thereby creating bridges between the outer cuts and spanning the inner cut. Element 14: the tip section of the inner cut includes fillets, removing the tip section includes removing the fillets. Element 15: creating the inner cut includes creating the inner cut extending either parallel to the central axis or toward the central axis from the inner face. Element 16: creating the inner cut includes milling the inner cut with a first milling tool and wherein creating the outer cut includes milling the outer cut with a second milling tool having a diameter greater than that of the first milling tool.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of manufacturing a shroud for an impeller, the shroud extending circumferentially around a central axis and defining an inner face oriented toward the central axis and an opposed outer face, the method comprising:

creating an inner cut circumferentially extending about the central axis, the inner cut defining an inner cut outline and extending from the inner face toward the outer face;

creating an outer cut defining an outer cut outline and extending from the outer face toward the inner face;

wherein the creating of the inner cut and the creating of the outer cut includes overlapping the inner and outer cut outlines at at least one circumferential location relative to the central axis by increasing a depth of one of the inner cut and the outer cut with a milling tool up to a point where an end of the milling tool is entirely received within the other of the inner cut and the outer cut such that, at the at least one circumferential location, a tip section of one of the inner cut outline and the outer cut outline is enclosed by the other of the inner cut outline and the outer cut outline.

2. The method of claim 1, wherein the overlapping of the inner and outer cut outlines includes increasing the depth of the outer cut with the milling tool until the tip section of the inner cut outline is machined away by the milling tool.

3. The method of claim 1, includes creating the inner cut before creating the outer cut.

4. The method of claim 1, wherein the tip section of the inner cut outline includes fillets.

5. The method of claim 1, wherein creating the inner cut includes creating the inner cut extending circumferentially all around the central axis.

6. The method of claim 1, wherein creating the outer cut includes creating the outer cut extending along a portion of a circumference of the shroud, overlapping the inner and outer cut outlines includes overlapping the inner and outer cut outlines along the portion of the circumference.

7. The method of claim 1, wherein creating the inner cut includes creating the inner cut extending either parallel to the central axis or toward the central axis from the inner face.

8. The method of claim 1, including inserting the milling tool through the inner face to create the inner cut outline up to a point where an area of an intersection between the inner and outer cut outlines is independent of an increase of the depth of the milling tool through the shroud; and rotating the milling tool relative to the shroud about the central axis to create the inner cut.

9. The method of claim 1, wherein the milling tool is a first milling tool, the creating of the inner cut includes milling the inner cut with the first milling tool and wherein the creating of the outer cut includes milling the outer cut with a second milling tool having a diameter greater than that of the first milling tool.

10. A method of manufacturing a shroud for an impeller, the shroud extending circumferentially around a central axis and defining an inner face oriented toward the central axis and an opposed outer face, the method comprising:

creating an inner cut from the inner face and extending circumferentially about the central axis, the inner cut having an inner cut outline; and creating an outer cut from the outer face and extending circumferentially about the central axis along a portion of a circumferential length of the inner cut, the outer cut having an outer cut outline, wherein the creating of the inner cut and the creating of the outer cut includes creating an opening between the inner cut and the outer cut with a milling tool up to a point where an area of the opening is independent of an increase of a depth of the milling tool through the shroud.

11. The method of claim 10, comprising rotating the milling tool relative to the shroud about the central axis to create the inner cut.

12. The method of claim 10, wherein the creating of the outer cut includes creating a plurality of outer cuts circumferentially distributed about the central axis thereby creating bridges between the outer cuts and spanning the inner cut.

13. The method of claim 10, wherein a tip section of the inner cut includes fillets, the creating of the opening with the milling tool including removing the tip section and removing the fillets.

14. The method of claim 10, wherein creating the inner cut includes creating the inner cut extending either parallel to the central axis or toward the central axis from the inner face.

15. The method of claim 10, wherein the milling tool is a first milling tool, the creating of the inner cut includes milling the inner cut with the first milling tool and wherein the creating of the outer cut includes milling the outer cut with a second milling tool having a diameter greater than that of the first milling tool.

16. A method of manufacturing a shroud for an impeller, the shroud extending circumferentially around a central axis and defining an inner face oriented toward the central axis and an opposed outer face, the method comprising:

creating a first cut defining a first cut outline and extending from one of the inner face and the outer face toward the other of the inner face and outer face;

creating a second cut defining a second cut outline and extending from the other of the inner face and outer face toward the one of the inner face and the outer face;

wherein one or both the first cut and the second cut extends circumferentially relative to the central axis, wherein the creating of the first cut and the creating of the second cut includes overlapping the first and second cut outlines at at least one circumferential location relative to the central axis by increasing a depth of the second cut with a milling tool until a tip section of the first cut outline is machined away by the milling tool such that, at the at least one circumferential location, the tip section of the first cut outline is enclosed by the second cut outline.

17. The method of claim 16, wherein the milling tool is a first milling tool, the creating of the first cut includes milling the first cut with the first milling tool and wherein the creating of the second cut includes milling the second cut with a second milling tool having a diameter greater than that of the first milling tool.

18. The method of claim 17, wherein the first cut extends from the inner face toward the outer face and wherein the second cut extends from the outer face toward the inner face.

* * * * *